United States Patent
Dawson et al.

(10) Patent No.: US 6,766,572 B2
(45) Date of Patent: Jul. 27, 2004

(54) METHOD OF ASSEMBLING A STATOR

(75) Inventors: Richard Nils Dawson, Voorheesville, NY (US); John A. Petti, Schenectady, NY (US); Steven C. Walko, Clifton Park, NY (US); Robert J. Nygard, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 35 days.

(21) Appl. No.: 10/046,761

(22) Filed: Jan. 17, 2002

(65) Prior Publication Data

US 2002/0070628 A1 Jun. 13, 2002

Related U.S. Application Data

(62) Division of application No. 09/726,542, filed on Dec. 8, 2000, now Pat. No. 6,448,686.

(51) Int. Cl.[7] .................. H02K 15/00; H02K 15/14; H02K 15/16
(52) U.S. Cl. ................ 29/596; 29/597; 29/598; 310/254; 310/258; 310/259
(58) Field of Search .................. 29/596, 597, 598; 310/258, 259, 254

(56) References Cited

U.S. PATENT DOCUMENTS

| | | | |
|---|---|---|---|
| 1,685,054 A | * | 9/1928 | Hibbard .................. 310/258 |
| 2,300,964 A | | 11/1942 | Putman |
| 3,153,215 A | | 10/1964 | Burkhardt et al. |
| 3,652,889 A | | 3/1972 | Reece et al. |
| 3,708,707 A | | 1/1973 | Kranz |
| 3,787,744 A | | 1/1974 | Saito |
| 3,988,622 A | | 10/1976 | Starcevic |
| 4,031,422 A | | 6/1977 | Armor et al. |
| 4,032,874 A | | 6/1977 | Kudlacik et al. |
| 4,145,626 A | | 3/1979 | Aroshidze et al. |
| 4,200,854 A | | 4/1980 | DeLaurentis et al. |
| 4,564,779 A | | 1/1986 | Terry, Jr. |
| 4,837,471 A | * | 6/1989 | Kostoss et al. .............. 310/89 |
| 4,859,891 A | | 8/1989 | Jenkins et al. |
| 4,904,890 A | | 2/1990 | Archibald et al. |
| 4,916,803 A | | 4/1990 | Estrada |
| 5,027,500 A | | 7/1991 | Keck et al. |
| 5,075,959 A | | 12/1991 | Keck et al. |
| 5,118,979 A | | 6/1992 | Shih et al. |
| 5,316,801 A | | 5/1994 | Hopeck |
| 5,329,197 A | | 7/1994 | Kudlacik |
| 5,358,432 A | | 10/1994 | Shih et al. |
| 5,398,397 A | * | 3/1995 | Johnson .................. 29/596 |
| 5,430,340 A | | 7/1995 | Shih et al. |
| 5,473,207 A | | 12/1995 | Hopeck et al. |
| 5,886,434 A | | 3/1999 | Nygard |
| 5,913,243 A | | 6/1999 | Hopeck et al. |
| 5,986,380 A | | 11/1999 | Kaminski et al. |
| 6,020,670 A | | 2/2000 | Jones et al. |
| 6,127,761 A | | 10/2000 | Shen et al. |
| 6,194,807 B1 | | 2/2001 | Kaminski et al. |
| 6,448,686 B1 | | 9/2002 | Dawson et al. |
| 6,597,081 B2 | | 7/2003 | Dawson et al. |

* cited by examiner

Primary Examiner—Carl J. Arbes
Assistant Examiner—Tim Phan
(74) Attorney, Agent, or Firm—Nixon & Vanderhye P.C.

(57) ABSTRACT

A stator comprises a stator frame, a plurality of key bars connected to the stator frame and a stator core. Each of the key bars has a dovetail. The stator core is formed by a pre-packaged stator core section including laminations each having a dovetail slot for engaging a respective dovetail. The stator core also includes a manually stacked stator core section including manually stacked laminations each having a dovetail slot for engaging respective dovetails. The cross-sectional area of the dovetail slots in the pre-packaged stator core section is larger than the cross-sectional area of the dovetail slots of the manually stacked stator core section.

14 Claims, 2 Drawing Sheets

METHOD OF ASSEMBLING A STATOR

This application is a division of Application Ser. No. 09/726,542, Dec. 8, 2000, and now U.S. Pat. No. 6,448,686, the entire content of which is hereby incorporated by reference in this application.

BACKGROUND OF THE INVENTION

The present invention relates to electric power generators and, more particularly, to a stator core having pre-packaged stator core sections and manually stacked stator core sections.

A stator of an electric power generator generally includes a stator core and a stator frame. The stator core typically has a cylindrical shape and comprises of a stack of insulated steel laminations. Each lamination is a segment of a full circle that has slots on its inner diameter to accommodate a stator winding and dovetail slots on its outer diameter.

The stator frame has a plurality of key bars connected (e.g., welded) thereto, each key bar having a dovetail to provide structural support for the stator core. During the assembly of the stator core, each stator core lamination is manually installed into the stator frame by engaging a dovetail slot with a corresponding key bar dovetail.

This method for assembling stator cores is very time consuming and can only be done at a limited number of stacking stations. Additionally, this method requires that the key bars connected to the stator frame be located at very tight positional tolerances to ensure that the stator core can be assembled properly. To simplify the stator frame construction, key bars can be welded to the stator frame after a precise machining of the key bar dovetails. Unfortunately, this welding causes distortion that makes controlling the location of the key bars difficult. A significant amount of rework must therefore often be performed including the disassembly of the stator core and relocation of the key bars.

Manufacturing stator cores using pre-packaged stator core sections has been accomplished in the past under special circumstances. During these manufacturing processes, the key bar dovetails must be machined to very tight positional tolerances after they are welded onto the stator frame. This requires specialized equipment and increases the cost of the stator frame and cycle time. In other designs, the key bars and the stator flanges are assembled to form a completed stator core. This completed stator core is then welded or otherwise secured to the stator frame. An advantage of the pre-packaged stator core is that it can be used almost in any type of frame design.

Magnetic forces are imposed on a stator core of an electric power generator during the operation thereof. These magnetic forces will cause a relative vibration between the key bar dovetails and the dovetail slots of the laminations if a close fit therebetween is not established. This relative vibration will often result in the laminations impacting the key bars to thus generate an annoying noise.

It would thus be beneficial to increase stator core production capacity by reducing a lengthy stator core stacking cycle and eliminating lamination stacking difficulties and rework caused by the poor ability to provide an appropriate key bar location. It would also be beneficial to utilize standard low cost stator frame designs and to eliminate noise caused by a vibrating stator core impacting the key bars.

BRIEF SUMMARY OF THE INVENTION

In an exemplary embodiment of the invention, a stator comprises a stator frame, a plurality of key bars connected to the stator frame, each of the key bars having a dovetail, and a stator core. The stator core includes a first stator core section including at least one lamination having a first dovetail slot formed therein for engaging a first one of the dovetails. The stator core further includes a second stator core section including at least one lamination having a second dovetail slot formed therein for engaging a second one of the dovetails. The second dovetail slot has a cross-sectional area which is smaller than the cross-sectional area of the first dovetail slot.

The first one of the dovetails projects into the first dovetail slot such that no portion of the first dovetail directly contacts the lamination having the first dovetail slot formed therein. The second one of dovetails projects into the second dovetail slot such that the second dovetail directly contacts a portion of the lamination having the second dovetail slot formed therein.

The first stator core section is a pre-packaged stator core section, the second stator core section is a manually stacked stator core section and more of the stator core is formed by the first stator core section than the second stator core section. The first stator core section is held to the stator frame by a force caused by core stacking pressure of the stator core.

In a further exemplary embodiment of the invention, the stator comprises a stator frame, a plurality of key bars connected to the stator frame, each of the key bars having a dovetail, and a stator core. The stator core includes a pre-packaged stator core section including at least one lamination having a first dovetail slot for engaging a first one of the dovetails. The stator core further includes a manually stacked stator core section including at least one manually stacked lamination having a second dovetail slot for engaging a second one of the dovetails.

In the further exemplary embodiment, the second dovetail slot has a cross-sectional area which is smaller than the cross-sectional area of the first dovetail slot. The first one of dovetails projects into the first dovetail slot such that no portion of the first dovetail directly contacts the lamination having the first dovetail slot formed therein. The second one of dovetails projects into the second dovetail slot such that the second dovetail directly contacts a portion of the lamination which forms the second dovetail slot formed therein. More of the stator core is formed by the pre-packaged stator core section than the manually stacked stator core section. The pre-packaged stator core section is held to the stator frame by a force caused by core stacking pressure.

In a yet another exemplary embodiment of the invention, a method of assembling a stator comprises providing a stator frame, connecting a plurality of key bars to the stator frame, each of the key bars having a dovetail, and forming a stator core. Forming the stator core includes forming a pre-packaged stator core section including at least one first lamination having a first dovetail slot and coupling the pre-packaged stator section to the stator frame by engaging a first one of the dovetails into the first dovetail slot. Forming the stator core also includes forming at least one second lamination having a second dovetail slot, and coupling the second lamination to the stator frame by manually stacking the second lamination such that a second one of the dovetails engages into the second dovetail slot to form a manually stacked stator core section.

In the yet another exemplary embodiment, the first and second dovetail slots are formed such that a cross-sectional area of the first dovetail slot in the pre-packaged stator core section is larger than the cross-sectional area of the second dovetail slot in the manually stacked stator core section. The pre-packaged stator core section is coupled to the stator frame such that no portion of the first dovetail directly contacts the lamination having the first dovetail slot formed therein. The second stator core section is coupled to the stator frame such that the second dovetail directly contacts a portion of the lamination having the second dovetail slot formed therein. More of the stator core is formed by the pre-packaged stator core section than the manually stacked stator core section. The pre-packaged stator core section is held to the frame by a force caused by core stacking pressure of the stator core.

BRIEF DESCRIPTION OF THE DRAWINGS

These, as well as other advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
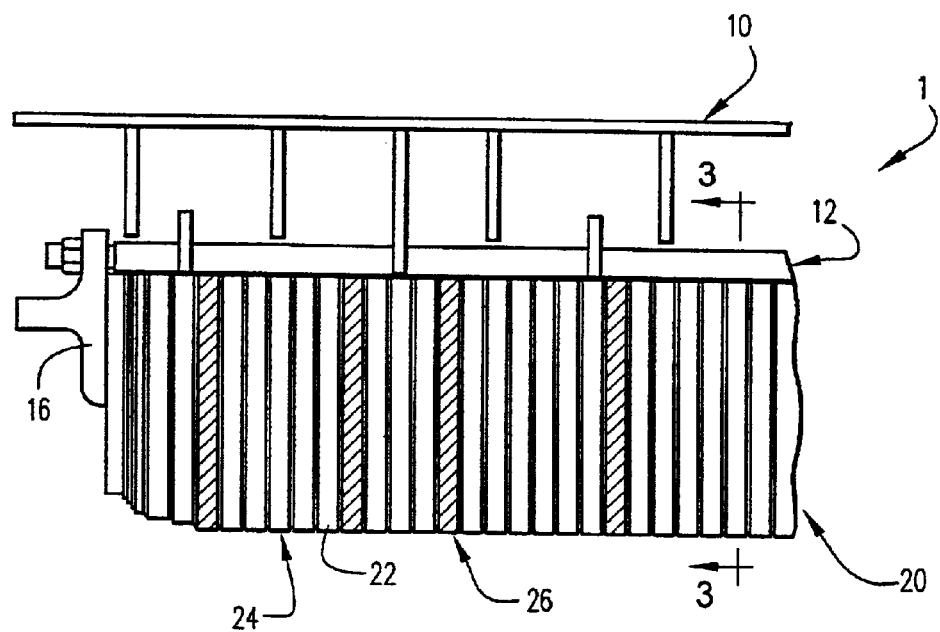
FIG. 1 is a partial cross-sectional view of a stator embodying the invention.

FIG. 1 is a partial cross-sectional view of a stator 1 of an electric power generator according to an exemplary embodiment of the present invention. The stator 1 includes a stator core 20 having a plurality of stacked laminations 22 and a stator frame 10 having a plurality of key bars 12 connected thereto. Each of the laminations 22 has slots (not shown) on its inner diameter to engage a stator winding and a plurality of dovetail slots 28a, 28b (see FIG. 3) on its outer diameter to engage the corresponding key bars 12.

The key bars 12 connected to the stator frame 10 each have a dovetail 14 which engages into a respective dovetail slot 28a, 28b of each lamination 22. Each lamination 22 can include a plurality of dovetail slots 28a, 28b to engage corresponding key bars 12. As will be discussed in detail below, dovetail slots 28a are formed in each lamination 22 of a pre-packaged stator core section 24, whereas dovetail slots 28b are formed in each lamination 22 of a manually stacked stator core section 26.

Figure 2:
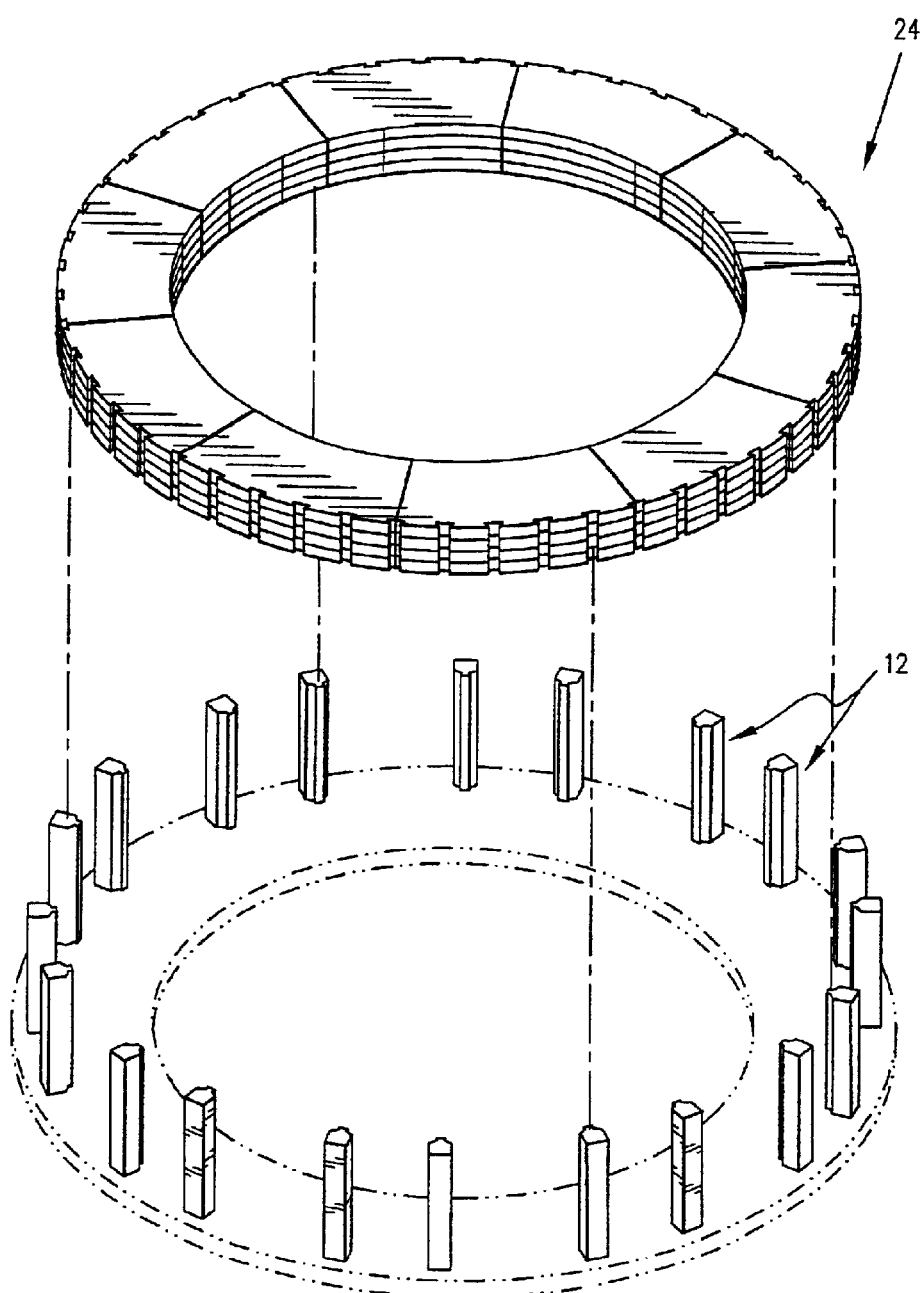
FIG. 2 is a schematic perspective view of a pre-packaged stator core section embodying the invention.

The stator core 20 includes a plurality of pre-packaged stator core sections 24 and a plurality of manually stacked stator core sections 26. As illustrated in FIG. 2, each pre-packaged core section 24 is formed by a ring of laminations 22, the ring being several inches in length. Each pre-packaged core section 24 is thus formed prior to its insertion into the stator frame 10 via the key bars 12. The pre-packaged stator core sections 24 are stacked using a mounting device and then inserted into the stator frame 10 by engaging the dovetails 14 of the key bars 12 into corresponding dovetail slots 28a of the laminations 22 forming the pre-packaged stator core sections 24.

The laminations 22 that are stacked together in the pre-packaged stator core sections 24 are similar to a standard design except that the dovetail slots 28a on the outer diameter of the laminations 22 are enlarged to increase the clearance space between the dovetails 14 and the portions of the corresponding laminations 22 defining the dovetail slots 28a. This increased clearance allows the pre-packaged stator core sections 24 to be inserted into the stator frame 10 without interfering with or binding on the key bars 12 connected to the stator frame 10. Furthermore, the increased clearance space provided by the enlarged dovetail slots 28a prevent any direct physical contact between the laminations 22 forming the pre-packaged stator core sections 24 and the engaged key bars 12. Since there is no contact between the laminations 22 (in particular, the portions of the laminations 22 which respectively form the dovetail slots 28a) and the engaged key bars 12, no noise is generated if the stator core vibrates during the operation of an electric power generator which incorporates the stator core 1. That is, even if there is a relative movement between the laminations 22 and the corresponding dovetails 14, no noise is generated since no portion of the key bars 12 contacts the laminations 22.

Figure 3:
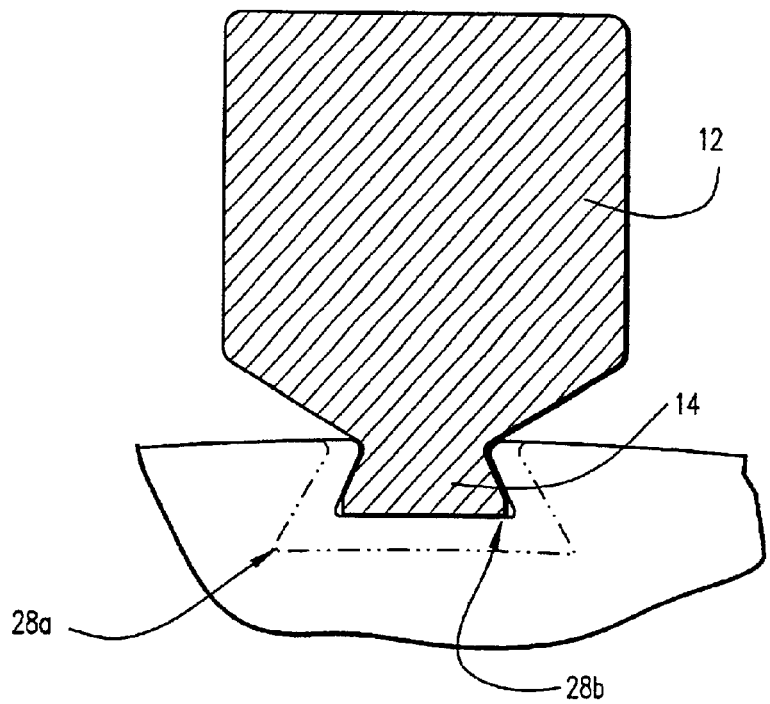
FIG. 3 is a cross-sectional view taken along line 3—3 of FIG. 1.

In addition to the pre-packaged stator core portions 24, the stator core 20 includes manually stacked stator core sections 26 (indicated by the cross-hatched lines in FIG. 1). Each of the manually stacked core stator sections 26 is formed by laminations 22, each of which has one or more dovetail slots 28b formed therein. As illustrated in FIG. 3, the dovetail slots 28b formed in the laminations 22 of the manually stacked stator core sections 26 have a smaller cross-sectional area than the dovetail slots 28a formed in the laminations 22 of the pre-packaged stator core sections 24. In fact, the dovetail slots 28b are smaller than the standard dovetail slots, whereas the dovetail slots 28a are larger than the standard dovetail slots. After the laminations 22 having the dovetail slots 28b are formed, each of the laminations 22 is manually stacked (i.e., stacked by hand) into the stator frame 10 by engaging one of the dovetails 14 of the key bars 12 into a respective one of the dovetail slots 28b to form a manually stacked stator core section 26. The clearance between the dovetail slots 28b and the corresponding dovetails 14 is small such that a tight connection between the lamination 22 having the dovetail slot 28b and the corresponding dovetail 14 is formed. The connection is thus not susceptible to impacting and noise generation.

As can be seen in FIG. 1, a majority of the stator core 20 is formed by the pre-packaged stator core sections 24. As noted above, the dovetail slots 28a of the laminations 22 forming the pre-packaged stator core portion 24 is large enough so that the respective dovetails 14 of the key bars 12 do not contact each another. The pre-packaged stator core sections 24 are thus held in place to the stator frame 10 by frictional forces generated by the core stacking pressure. This core stacking pressure originates from the normal force generated by stator flanges 16 (one of which is illustrated in FIG. 1). The manually stacked core sections 24 are also held to the stator frame 10 by the frictional forces generated by core stacking pressure and by being tightly connected to the key bars 12.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of assembling a stator comprising:

providing a stator frame;

connecting a plurality of key bars to said stator frame, each of said key bars having a dovetail; and forming a stator core including:
  forming a pre-packed stator core section including at least one first lamination having a first dovetail slot;
  coupling said pre-packed stator section to said stator frame by engaging a first one of said dovetails into said first dovetail slot;
  forming at least one second lamination having a second dovetail slot; and
  coupling said second lamination to said stator frame by manually stacking said second lamination such that a second one of said dovetails engages into said second dovetail slot to form a manually stacked stator core section;
  wherein said first and second dovetail slots are formed such that a cross-sectional area of said first dovetail slot is larger than a cross-sectional area of said second dovetail slot.

2. The method of claim 1 wherein said pre-packaged stator core section is coupled to said stator frame such that no portion of said first one of dovetails directly contacts said lamination having said first dovetail slot formed therein.

3. The method of claim 2 wherein said manually stacked stator core section is coupled to said stator frame such that said second one of dovetails directly contacts a portion of said lamination having said second dovetail slot formed therein.

4. The method of claim 1 wherein more of said stator core is formed by said pre-packaged stator core section than said manually stacked stator core section.

5. The method of claim 1 where said pre-packaged stator core section is held to said stator frame by a force caused by core stacking pressure of said stator core.

6. A method of assembling a stator comprising:
providing a stator frame;
connecting a plurality of key bars to said stator frame, each of said key bars having a dovetail; and
forming a stator core including:
  forming a pre-packed stator core section including at least one first lamination having a first dovetail slot;
  coupling said pre-packed stator section to said stator frame by engaging a first one of said dovetails into said first dovetail slot;
  forming at least one second lamination having a second dovetail slot; and
  coupling said second lamination to said stator frame by manually stacking said second lamination such that a second one of said dovetails engages into said second dovetail slot to form a manually stacked stator core section;
wherein more of said stator is formed by said pre-packaged stator core section than said manually stacked stator core section.

7. A method of assembling a stator comprising:
providing a stator frame;
connecting a plurality of key bars to said stator frame, each of said key bars having a dovetail; and
forming a stator core including:
  forming a pre-packed stator core section including at least one first lamination having a first dovetail slot;
  coupling said pre-packed stator section to said stator frame by engaging a first one of said dovetails into said first dovetail slot;
  forming at least one second lamination having a second dovetail slot; and
  coupling said second lamination to said stator frame by manually stacking said second lamination such that a second one of said dovetails engages into said second dovetail slot to form a manually stacked stator core section;
wherein said pre-packaged stator core section is held to said stator frame by a force caused by core stacking pressure of said stator core.

8. A method of assembling a stator comprising:
providing a stator frame;
connecting a plurality of key bars to said stator frame, each of said key bars having a dovetail; and
forming a stator core including:
  forming a first stator core section including at least one lamination having a first dovetail slot formed therein for engaging a first one of the dovetails; and
  forming a second stator core section including at least one lamination having a second dovetail slot formed therein for engaging a second one of the dovetails, the second dovetail slot having a cross-sectional area which is smaller than a cross-sectional area of the first dovetail slot.

9. The method of claim 8 wherein the first one of dovetails projects into the first dovetail slot such that no portion of the first one of dovetails directly contacts the lamination having the first dovetail slot formed therein.

10. The method of claim 9 wherein the second one of dovetails projects into the second dovetail slot such that the second one of dovetails directly contacts a portion of the lamination having the second dovetail slot formed therein.

11. The method of claim 8 wherein the first stator core section is a pre-packaged stator core section.

12. The method of claim 11 wherein the second stator core section is a manually stacked stator core section.

13. The method of claim 12 wherein more of the stator core is formed by the first stator core section than the second stator core section.

14. The method of claim 8 wherein the first stator core section is held to the stator frame by a force caused by core stacking pressure of the stator core.

* * * * *

UNITED STATES PATENT AND TRADEMARK OFFICE
CERTIFICATE OF CORRECTION

PATENT NO.      : 6,766,572 B2
DATED           : July 27, 2004
INVENTOR(S)     : Dawson et al.

It is certified that error appears in the above-identified patent and that said Letters Patent is hereby corrected as shown below:

Column 5,
Lines 2, 4, 40 and 42, delete "pre-packed" and insert -- pre-packaged --
Line 52, after the word "core" insert the word -- stator --

Column 6,
Lines 6 and 8, delete "pre-packed" and insert -- pre-packaged --

Signed and Sealed this

Fourth Day of January, 2005

JON W. DUDAS
*Director of the United States Patent and Trademark Office*